April 29, 1941.  W. FERRANT  2,239,887
LUMINESCENT SCREEN
Filed Aug. 25, 1938
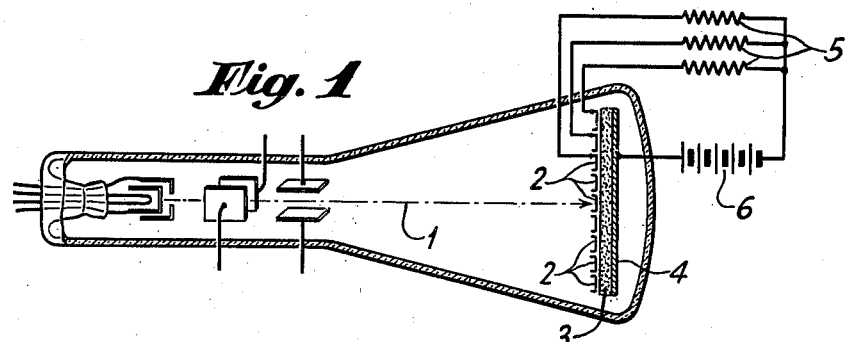
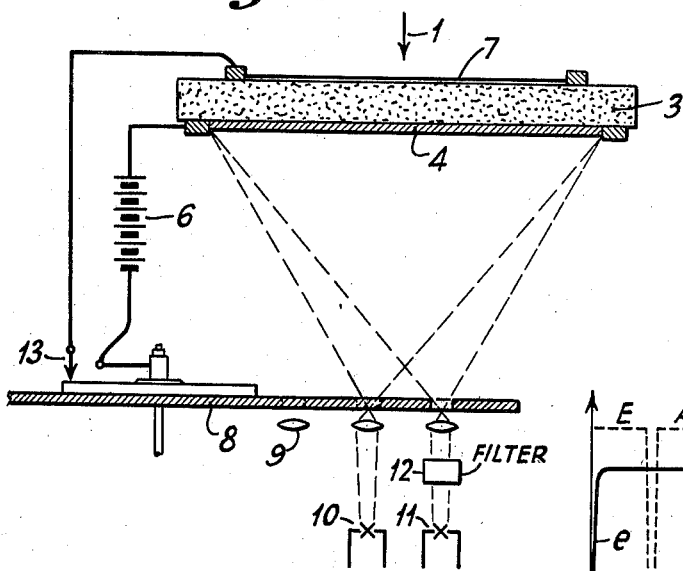
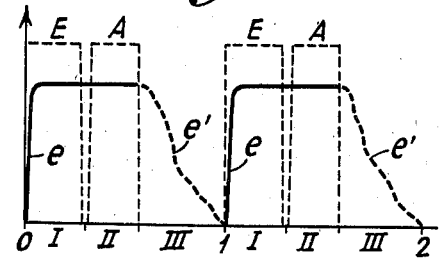
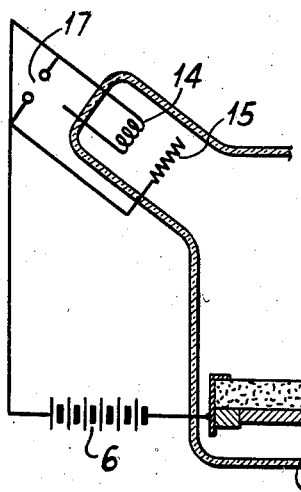
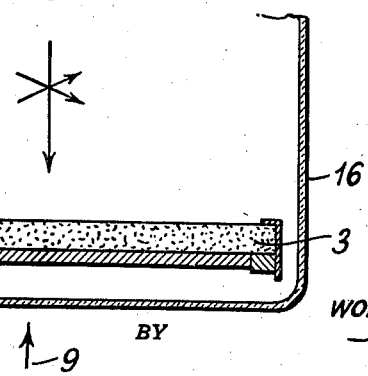
INVENTOR.
WOLFGANG FERRANT
BY H. S. Grover
ATTORNEY.

Patented Apr. 29, 1941

2,239,887

UNITED STATES PATENT OFFICE 2,239,887

LUMINESCENT SCREEN

Wolfgang Ferrant, Berlin-Reinickendorf, Germany, assignor to General Electric Company, a corporation of New York Application August 25, 1938, Serial No. 226,704
In Germany July 2, 1937

9 Claims. (Cl. 178—7.5)

This invention relates to luminescent screens and in particular, to the method and means for increasing the intensity and efficiency of illumination of such screens.

It is known in the art that phosphors, for instance, zinc sulfide when placed within an electric field during excitation, are caused to flash up as soon as the electric field is removed. This was first shown by an experiment made by Lenard that has attracted comparatively little attention. In this experiment, the condenser in which the field was created consisted of comb-shaped electrodes which are shifted together so as to interleave. The interstitial spaces were filled up with pulverulent luminescent phosphor (see Handbuch der Experimental Physik, published by Wien and Harms, vol. 23, part I, pp. 226–8, especially section b). Now, there has been a demand for a long while to make luminescent screens exhibiting a high degree of intrinsic luminosity or brilliance. Luminescent screens of this kind are required in Braun or cathode-ray tubes for measuring and for television purposes, in electron microscopes, as fluorescent screens for Roentgen-ray work, and other purposes in practice.

Now, according to this invention for the recording or tracing of images of all kinds, luminescent screens are to be used which are excited by uniform irradiation inside an electrical field, and which flash-up while subject to the radiation is to be visualized or to be rendered visible or otherwise perceptible. Details of the invention shall be explained in more detail by the following description of the same in which reference will be made to the drawing, in which Fig. 1 shows schematically the elements of the invention including a cathode ray tube having a luminescent screen prepared in accordance with the invention, Fig. 2 shows schematically a modification of the luminescent screen shown in Fig. 1 using mechanical method of commutation, Fig. 3 is a graphical representation of signalling impulses for use in explaining the invention, and Fig. 4 shows a modification of the embodiment of the screens shown in Fig. 1 and Fig. 3 and using cathode ray excitation for controlling the conductivity of the screen.

The creation of the luminescent image is divided into two or three phases which may recur and be reiterated in rapid succession so that the intensity will be enhanced and magnified to the highest possible degree and so that the impression of uniform motion is created whenever animated pictures are dealt with. What is essential is that in the last phase or stage of the picture recreation of a "field profile" or pattern is set up in the phosphor (that is, an electric field) which will correspond to the incident light so that the luminescence of the phosphor corresponds to the field profile thus created and thus to the image.

An exemplified embodiment is as follows. An image being produced, for instance, by the electronic pencil or "brush" of a cathode-ray oscillograph, is available as the electric charge per picture element (Fig. 1). If, then, the picture area or field swept by the pencil 1 is divided into a great many parts, and if each such part is provided, for example, with a Faraday cage or collector 2 or an equivalent means, then the charges set up therein could be applied to a phosphor plate 3 which likewise is subdivided into a great number of condensers corresponding to the picture field. The cooperating electrode 4 need not be subdivided, though it should preferably be transparent and conductive, hence, it may be in the form of a tenuous film of silver. Viewing is from this end or side. The three (or two) phases of the picture creation proceed as follows: 1st phase: The subdivided condensers 2—4 are united through high resistances 5 with an auxiliary source of potential 6 and are incidentally charged. At the same time, the phosphor plate by irradiation with a uniform source of light of proper wave length, is strongly excited, with the path of rays from the phosphor plate to the observer being blocked. Second phase: Voltage is still applied to the subdivided condenser, the path of the rays in the direction of the viewer is still blocked, though another radiation path for infra-red light is opened with the result that the phosphor plate light emission is increased, as is well known in the art, while the ray path for excitation is blocked. This second phase is unnecessary if sufficient time is available for full illumination. Third phase: The path of rays to the viewer is opened, the path of rays for excitation, as during phase II is blocked, and optionally also the ray path for the irradiating infra-red radiation may be blocked. During the third phase, however, also the voltage providing the auxiliary field and furnished from the source 6 may be disconnected or rendered inoperative so that the image intensity supplied by virtue of the electron pencil occasions discharges on the subdivided condensers which cause corresponding field variations in the subdivided condenser. In other words, there results a "field-intensity profile" which corresponds to the picture, which, in turn, results in luminescence of the phosphor plate, unduly rapid decay of the pattern is prevented by the resistances 5. According to the speed of the impacting electrons they may render the plate negative or else (as a result of secondary electron emission) also positive. The polarity of the source of potential supply must be chosen accordingly.

The paths of the rays for observation, for the excitation of the phosphor plate and the illumination are opened and blocked by the agency, say of a revolving disk or shutter having suitable sectors or openings. Fig. 2 shows a further exemplified embodiment. The phosphor plate 3, upon the face turned towards the viewer, similarly as in the first exemplified embodiment here described, bears a transparent and conductive coat or film 4. The other coat consists of a layer 7 of very high resistance. The latter, in fact should be so high that such charges as have been produced and placed thereon will have a chance to be equalized and neutralized only within an appreciable space of time. The said high-resistance layer corresponds to the lead resistances 5 brought to the subdivided condenser coat 2, Fig. 1. The three phases of picture recreation proceed in this instance in the very same way as described by reference to Fig. 1. A revolving disk 8 having suitable openings renders operative or inoperative, as the case may be, the ray path for the observer at 9, for the exciting radiation such as a mercury-vapor lamp at 10, and for an arc-lamp 11 which has mounted anteriorly of it a filter 12 which permits the transmission therethrough only of infra-red rays. Disconnection of the potential impressed upon the coat 7 on the phosphor plate is accomplished, for instance, by the agency of the commutator 13.

The three (or two) phases of picture creation are graphically indicated by Fig. 3. In the direction of the time there is first phase I. Potential e is applied to the phosphor plate, excitation starts (E). Phase II: Excitation E is terminated, and, if necessary, the irradiation or illumination period begins (A). Phase III: Potential e' is disconnected from the phosphor plate so that, by virtue of a radiation acting from the outside and which is equivalent to an image, a field-intensity pattern or contour is produced on the phosphor plate (with e' to be conceived in planar dimension) which will give rise to the luminescence corresponding thereto.

In the past the cause for the arising of such field profile has always been thought to reside in the discharge of the coat 2 or 7 by ion or electron rays or light. However, the screen is suited also to render Roentgen-ray pictures visible. For if an arrangement, say, of a nature shown in Fig. 1 or 2 is suitably irradiated by X-rays after the latter have been transmitted through a hand, for example, there results a corresponding shadow picture and the Roentgen-radiation changes (or, as a general rule, raises) the conductivity of the plate 3 with the result that the constituent parts of the phosphor plate will be discharged in accordance with the intensity of the Roentgen rays. In other words, the field profile in this instance is occasioned by virtue of the conductivity of the plate. The same thing holds good, under certain circumstances, also with the use of light rays in lieu of X-rays; in fact, according to the nature of the radiation both effects may cooperate in varying proportions. While slower electrons up to a few thousand volts will predominantly produce a discharging action, electrons of extremely high speed which penetrate into the plate may cause a noticeable increase in the conductivity thereof. However, it is not only possible to raise the conductivity of the plate, but also that of such spaces either evacuated, air or gas-filled as may be present between the plate and the coat by the aid of the impinging radiations. The surface charge, according to a further object of the invention could be altered also by the aid of ionizing currents in such a way that the phosphor plate forms an electrode of an ionizing chamber.

The arrangements illustrated in Figs. 1 and 2 are adapted above all for the production of brief pictures or frames succeeding each other at comparatively long time spaces or sequence and with inherent great brilliance inasmuch as in this case the preparation period of the first and the second phase may be long. It is then feasible to make the resistances 5 (Fig. 1) or the resistance of the coat 7 (Fig. 2) very high; or the coat 2 and 7, respectively, during the third phase may even be disconnected from the source of potential 6 with the result that the field profile set up shock or impulse-like by the Roentgen rays is unable to become rapidly neutralized through the resistances.

Certain difficulties are liable to arise in the embodiments shown in Fig. 1 or 2 whenever the phases are to be passed in rapid sequence or when the primary picture is of low intensity and available for a constant length of time. In this instance, the resistances 5 (Fig. 1) and resistance 7 (Fig. 2) must be chosen of small value, and this would result in premature blurring of the image. Of course, the best plan would be to make the resistance of the phosphor plate surface in one case low, say, of an order of magnitude of metallic coats, and then again very high (that is, during the building up of the field profile by the picture being available in some suitable form), say, of an order of magnitude equal to the surface resistance of the highest grade of insulator. This requirement will be satisfied when the non-conducting high-insulation surface of the phosphor plate is charged by the aid of an electron or ion current, preferably by particles or low energy (say, 5 v.), that is, so that no ionization of possibly existing gases and no release of secondary corpuscles from the plate will be produced.

An arrangement of this kind is shown in Fig. 4 in which the stream of electrons or ions issuing from 14 may be controlled by the agency of the grid 15. The assembly is accommodated inside the glass vessel 16. The transparent and conducting electrode 4 is again connected with the pole of the source of potential supply 6, the other pole of the latter is joined to the cathode 14. The observer is located at 9. The constituent phases or stages of picture creation are passed in the following fashion. During the first and the second phase, the charged particles, say, electrons, are able to fly through the grid 15, so that they will charge the surface of the phosphor plate 3 until there exists no more potential difference between the surface of the phosphor plate and the incandescent wire. Excitation and illumination, etc., are effected in the same manner as in the other exemplified embodiments. During the third phase the electrons are prevented from flying through the grid by virtue of the action of the control grid 15 so that upon the ensuing variation of the surface charge by the focused and incident picture no charge currents are able to flow from the hot filament.

Another mode of rendering rapidly changing images visible consists in building the screen in the form of a cylindrical drum revoluble about its axis or else in the form of a disk adapted to rotate in its plane about a center. In this instance the rebuilding of the excited phosphor may take place inside the length of time which elapses when the portion of the disk or drum under consideration has left the field of observation up to the instant when subject to the pencil tracing the picture and generating the field profile. It will be understood that in this mode of operation the image to be visualized must be subjected to such synchronizing control action that it will present itself to the eye of the viewer in proper composition.

Suitable phosphor plates which possess adequately high puncture strength may be made in such a way that the pulverulent phosphors are mixed with varnishes or melting resins resulting in transparency when solidified or by making enamel-like melts with admixture of the phosphors.

What I claim is:

1. The method of reproducing images on a fluorescent screen which comprises the steps of producing substantially constant elemental charges on said screen, irradiating the screen with radiant energy to induce fluorescence to produce illumination of said screen, removing the radiant energy, and subsequently abruptly reducing sequentially the elemental charges in accordance with the light values of elemental areas of the image to be reproduced.

2. The method of reproducing images on a fluorescent screen which comprises the steps of producing a plurality of substantially constant elemental electrical charges on said screen, irradiating the charged surface with radiant energy to induce fluorescence to produce illumination from said screen, removing the radiant energy, and electronically abruptly reducing sequentially the elemental charges in proportion to the light value of elemental areas of the image to be reproduced.

3. The method of reproducing images on a fluorescent screen which comprises the steps of producing a plurality of substantially constant elemental electrical charges on said screen, irradiating the screen with radiant energy of a predetermined wave length to induce fluorescence, removing the radiant energy, irradiating the screen with radiant energy of a wave length different from the predetermined wave length of said first named radiant energy, removing said second named radiant energy, and electronically abruptly reducing sequentially the elemental charges in proportion to the light value of elemental areas of the image to be reproduced.

4. The method of reproducing images on a fluorescent screen which comprises the steps of producing a plurality of substantially constant elemental electrical charges on said screen, irradiating the screen with radiant energy of a predetermined wave length to induce fluorescence, removing the radiant energy, irradiating the screen with radiant energy of a wave length longer than the predetermined wave length of said first named radiant energy, removing said second named radiant energy, and electronically abruptly reducing sequentially the elemental charges in proportion to the light value of elemental areas of the image to be reproduced.

5. Apparatus for reproducing luminescent images on a fluorescent screen comprising means for producing substantially constant elemental charges on said screen, means for irradiating the screen with radiant energy to induce fluorescence to produce illumination of said screen, means for removing the radiant energy, and means for subsequently abruptly reducing sequentially the elemental charges in accordance with the light values of elemental areas of the image to be reproduced.

6. Apparatus for reproducing luminescent images on a fluorescent screen comprising means for producing a plurality of substantially constant elemental electrical charges on said screen, means for irradiating the charged surface with radiant energy to induce fluorescence to produce illumination from said screen, means for removing the radiant energy, and means for electronically abruptly reducing sequentially the elemental charges in proportion to the light value of elemental areas of the image to be reproduced.

7. Apparatus for reproducing luminescent images on a fluorescent screen comprising means for producing a plurality of substantially constant elemental electrical charges on said screen, means for irradiating the screen with radiant energy of a predetermined wave length to induce fluorescence, means for removing the radiant energy, means for irradiating the screen with radiant energy of a wave length different from the predetermined wave length of said first named radiant energy, means for removing said second named radiant energy, and means for electronically abruptly reducing sequentially the elemental charges in proportion to the light value of elemental areas of the image to be reproduced.

8. Apparatus for reproducing luminescent images on a fluorescent screen comprising means for producing a plurality of substantially constant elemental electrical charges on said screen, means for irradiating the screen with radiant energy of a predetermined wave length to induce fluorescence, means for removing the radiant energy, means for irradiating the screen with radiant energy of a wave length longer than the predetermined wave length of said first named radiant energy, means for removing said second named radiant energy, and means for electronically abruptly reducing sequentially the elemental charges in proportion to the light value of elemental areas of the image to be reproduced.

9. Apparatus for producing luminescent images comprising a screen having a layer of luminescent material, a thin conductive coating upon said layer of a luminescent material, means to produce substantially constant elemental charges upon the uncoated surface of said luminescent material, means to irradiate the uncoated surface of said luminescent material with radiant energy to induce fluorescence during predetermined time intervals, and electronic means for reducing the elemental charges from said luminescent screen between said time intervals.

WOLFGANG FERRANT.